United States Patent
Daudelin et al.

(10) Patent No.: US 6,915,123 B1
(45) Date of Patent: Jul. 5, 2005

(54) METHOD AND SYSTEM FOR MONITORING AN OPERATIONAL AREA OF A SUBSCRIBER STATION

(75) Inventors: Douglas Streeter Daudelin, Independence, NJ (US); Zoran Siveski, New York City, NY (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/517,059

(22) Filed: Mar. 2, 2000

(51) Int. Cl.[7] .................... H04Q 7/20; H04M 1/66
(52) U.S. Cl. ............... 455/410; 455/411; 455/423; 455/67.11; 455/456.1
(58) Field of Search ................ 455/410, 411, 455/423, 456.1, 432.1, 67.11, 67.16, 421, 435.1; 340/5.2, 5.8

(56) References Cited

U.S. PATENT DOCUMENTS

| | | | | |
|---|---|---|---|---|
| 5,711,000 A | * | 1/1998 | Ploeg et al. ............. | 455/423 |
| 5,715,518 A | * | 2/1998 | Barrere et al. ............ | 340/5.8 |
| 5,835,857 A | * | 11/1998 | Otten ..................... | 455/410 |
| 5,870,672 A | * | 2/1999 | Stoddard et al. .......... | 455/410 |
| 5,905,950 A | * | 5/1999 | Anell ..................... | 455/421 |
| 5,940,751 A | * | 8/1999 | Kaplan et al. ........... | 455/411 |
| 6,026,304 A | * | 2/2000 | Hilsenrath et al. ........ | 455/456 |
| 6,269,246 B1 | * | 7/2001 | Rao et al. ............... | 455/456 |

* cited by examiner

Primary Examiner—Erika A. Gray (57) ABSTRACT

A system and method for monitoring the operational area of one or more subscriber stations in a wireless system facilitates determining whether subscriber stations are operating in their authorized coverage areas or not. The system and method first defines a characteristic composite fingerprint for a subscriber station associated with the operation of a subscriber station in an authorized coverage area. An operational area monitor monitors an operational composite fingerprint for the subscriber station. The monitor or another network element compares the operational composite fingerprint to the characteristic composite fingerprint to determine if the subscriber station is operating within the authorized coverage area or the restricted coverage area.

25 Claims, 7 Drawing Sheets

FIG. 8

METHOD AND SYSTEM FOR MONITORING AN OPERATIONAL AREA OF A SUBSCRIBER STATION

FIELD OF THE INVENTION

The present invention relates generally to a wireless communications system, and more particularly, to a method and system for monitoring an operational area of a subscriber station.

BACKGROUND

Wireless service providers sometimes provide different coverage areas for communication services and assign different billing rates to the coverage areas. For example, a service provider may provide communications service within a limited coverage area and an extended coverage area. By definition, the extended coverage area affords communication service over a greater geographic region than the limited coverage area. Because of the greater coverage area associated with the extended coverage area, the service provider may charge a premium billing rate for the subscribers communications within the extended coverage area, as opposed to the limited coverage area.

If a subscriber station is capable of operating anywhere in the extended coverage area or in the limited coverage area, the opportunity for subscriber fraud arises. For instance, a subscriber that only pays the service provider for operation in the limited coverage area may attempt to improperly use the subscriber station in the extended coverage area. That is, a subscriber may simply move the subscriber station from its authorized limited coverage area without paying requisite charges to the service provider for operation in the extended coverage area. Thus, a need exists for a method and system for monitoring in what area a subscriber station is operating (i.e., the operational area of the subscriber station) on a wireless communications system.

SUMMARY OF THE INVENTION

In accordance with one aspect of the invention, a system and method for monitoring the operational area of one or more subscriber stations in a wireless system facilitates determining whether subscriber stations are operating in their authorized coverage areas or not. The system and method first defines a characteristic composite fingerprint for a subscriber station associated with the operation of a subscriber station in its authorized coverage area. A composite fingerprint refers to a statistical compilation of detected signal characteristics of a receive signal received from the subscriber station. A characteristic composite fingerprint refers to a composite fingerprint associated with the subscriber station transmitting within an authorized coverage area or another known area. An authorized coverage area is a coverage area where communications service is intentionally provided to a particular subscriber station. In contrast, a restricted coverage area is a coverage area where communication service to a particular subscriber station is prohibited or limited. An operational area monitor monitors an operational composite fingerprint for the subscriber station. The operational composite fingerprint refers to a composite fingerprint that is determined while a subscriber station is active (i.e., communicating with the base station), regardless of whether the subscriber station is located in the authorized coverage area or the restricted coverage area. The monitor or another network element compares the operational composite fingerprint to the characteristic composite fingerprint to determine if the subscriber station is operating within the authorized coverage area or the restricted coverage area. Thus, the method and system of the invention is well-suited for fraud detection in wireless communications and for restricting communications service for one or more subscriber stations to an authorized coverage area.

DETAILED DESCRIPTION

Wireless Communication System

Figure 1A:
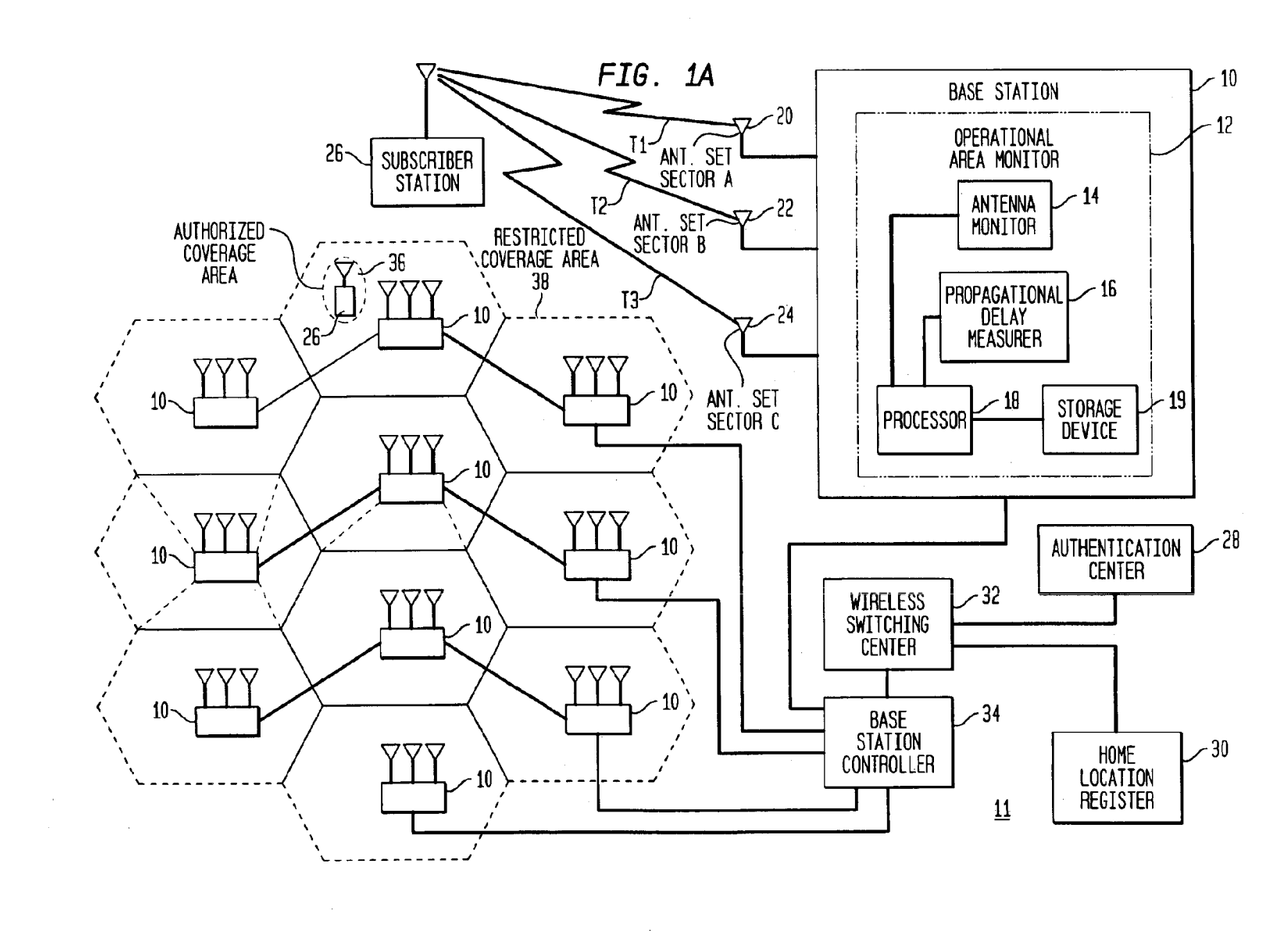
FIG. 1A shows a block diagram of a wireless communications system in accordance with the invention.

In accordance with the invention, FIG. 1A shows a block diagram of a wireless communication system 11 for determining whether one or more subscriber stations 26 are operating within an authorized coverage area 36. Base stations 10 provide coverage defined in terms of cells or sectors thereof. A restricted coverage area 38 and an authorized coverage area 36 may be defined for each corresponding subscriber station 26.

An authorized coverage area 36 includes a region within a cell or a sector which the subscriber station 26 is authorized to use. For example, an authorized coverage area 36 may include a coverage area that serves a subscriber's business or residence as a fixed wireless service. Although the authorized coverage area 36 in FIG. 1A is a round area, the authorized coverage area may have another shape. The authorized coverage area 36 may be associated with the signal coverage provided by one or more base stations. Although the authorized coverage area 36 may be fully contained within a cell or sector as shown, the authorized coverage area 36 may be formed by the union of or overlapping of coverage areas within adjacent cells or sectors.

A restricted coverage area 38 includes one or more cells or sectors, or geographic portions thereof, which represent a service area that the subscriber station 26 is not authorized to use. In FIG. 1A, the restricted coverage area 38 is indicated by the dashed lines. Here, the restricted coverage area 38 surrounds the authorized coverage area 36.

One or more base stations 10 communicate to a base station controller 34. For example, a base station 10 that ordinarily provides coverage to the subscriber station 26 in the authorized coverage area 36 communicates with the base station controller 34. The base station controller 34 is coupled to a wireless switching center 32. The wireless switching center 32 is coupled to an authentication center 28 and a home location register 30. A subscriber station 26 may transmit to one or more base stations 10 via a reverse channel. In a preferred embodiment, the base station 10 comprises a CDMA capable base station.

Each base station 10 may contain a plurality of directional antenna sets (20, 22, and 24). For illustrative purposes, a base station 10 in FIG. 1A is associated with three sets of directional antennas designated a first antenna sector set 20, a second antenna sector set 22 and a third antenna sector set 24, although other numbers of antennas and configurations may be used to practice the invention, such as a single antenna per set.

In general, an operational area monitor 12 may be implemented as software instructions on an existing or commercially available base station 10 or by the addition of both hardware and software instructions to an existing base station. For illustrative purposes as shown in FIG. 1A, the operational area monitor 12 includes an antenna monitor 14 and a propagational delay measurer 16 coupled to a processor 18. In turn, the processor 18 is coupled to a storage device 19.

Reception of Subscriber Station Signals

Figure 1B:
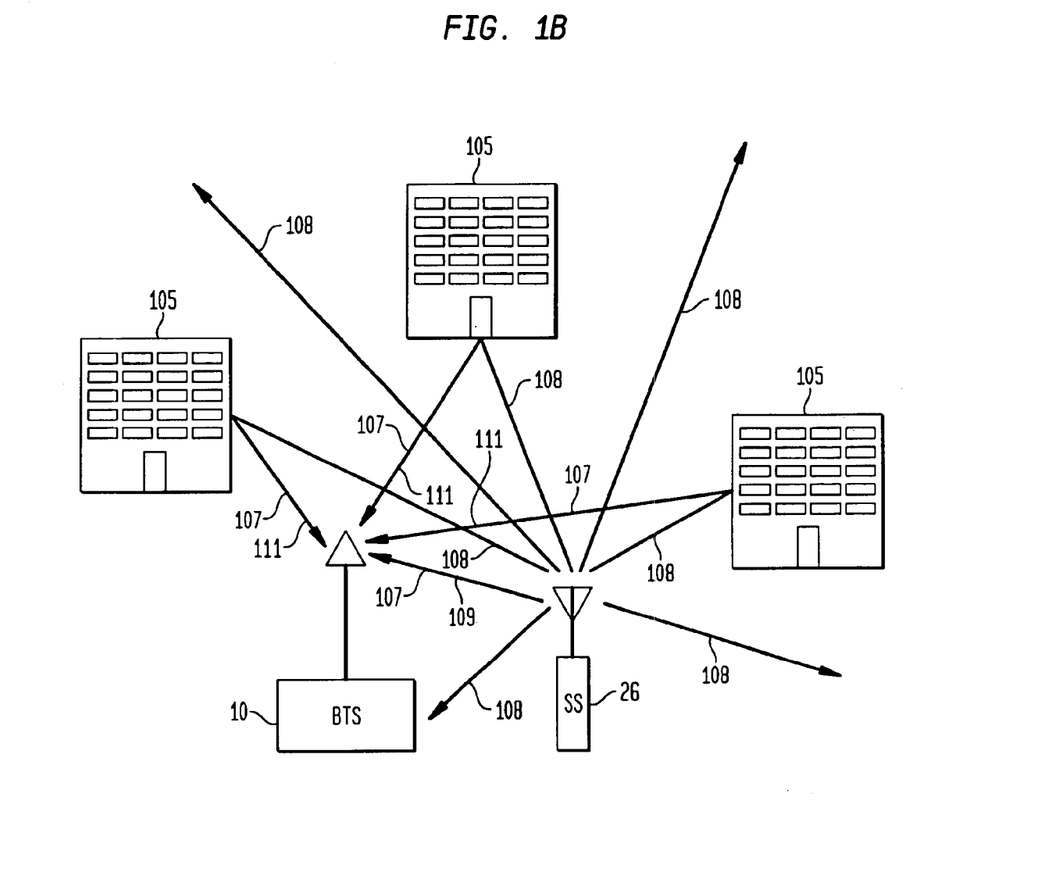
FIG. 1B illustrates multi-path signal propagation between a base station and a subscriber station in the wireless communication system of FIG. 1A.

Referring to FIG. 1B, the subscriber station 26 transmits a reverse channel signal to the base station 10. As shown in FIG. 1B, the reverse channel may be transmitted as an omnidirectional signal with signal components 108 radiating into many different directions. The reverse channel signal may be received at the base station 10 as a plurality of receive signals 107 offset in time from each other. The conversion of the single transmitted signal from the subscriber station 26 to multiple temporally offset receive signals 107 at the base station 10 is sometimes referred to as multi-path reception. Multi-path reception occurs where the receive signal 107 is reflected from an obstacle 105 and takes multiple propagational paths between the subscriber station 26 and the base station 10. For example, the base station 10 may receive a direct or line-of-sight signal 109 from the subscriber station 26 and a group of reflective signals 111 over various indirect paths from the subscriber station 26. Thus, the base station receiver may receive one receive signal or multiple temporally offset receive signals 107 transmitted from the subscriber station 26.

In the context of a code-division multiple access system, the baseband signal modulation includes spreading by a pseudo-random code sequence. To demodulate the signal, a demodulator of the base station 10 must despread the received modulated signal by the same pseudo-random code sequence used for encoding, but by a temporal offset that depends on the delay encountered by the reverse channel signal during propagation between the subscriber station 26 and the base station 10.

A receiver of the base station 10 preferably comprises a rake receiver, which independently demodulates different temporally offset versions of the receive signal 107 from a subscriber station 26 and then combines the different versions, to achieve diversity gain where possible. The rake receiver includes multiple demodulators, which are sometimes referred to as fingers. In the presence of multi-path propagation, a group of fingers of the rake receiver may be dynamically assigned to a number of temporally offset versions of a signal for a reverse channel signal of a subscriber station 26. The receiver of base station 10 includes a signal searcher which repetitively scans the receive signals 107 incident upon the antenna sets of the base station 10 to identify the highest quality, temporally offset versions of a receive signal 107 for assignment to the fingers of the rake receiver.

Each finger of the rake receiver may be dynamically assigned a unique temporal offset, which may be referred to as the propagational delay factor. At a sampling interval, a finger is preferably assigned to a specific propagational delay and a specific antenna. The propagational delay represents a temporal offset which when applied to a reference pseudo-random code allows demodulation of a receive signal by the finger. That is, the rake receiver may time-shift the reference pseudo-random code sequence to demodulate the receive signal. Regardless of whether multi-path propagation is present, during a sampling interval, the antenna monitor 12 preferably measures the number of observations of a subscriber station's signal received on each particular uplink antenna set (20, 22, or 24) associated with the base station 10. An observation represents the detection of a valid reverse link signal above a noise floor during a sampling interval. An uplink antenna set (20, 22, or 24) refers to one or more antennas that may receive a reverse link signal from a subscriber station 26 to a base station 10. For example, an uplink antenna set may include two antennas to realize space-diversity reception.

Propagational Delay Measurer

The propagational delay measurer 16 measures the number of observations of various propagational delays for a given subscriber station 26 during a call or data transmission. The propagational delays refer to the different propagational delays that are present in the uplink receive signals that traverse different propagational paths from the subscriber station 26 to the base station 10. In a code-division, multiple-access (CDMA) system, the propagational delay measurer 16 may measure a propagational delay by comparing the reference pseudo-random code sequence with the receive pseudo-random code sequence. The time offset between the reference pseudo-random code sequence and the received pseudo-random code sequence represents the propagational delay factor. Here, the time offset measured is caused by the multi-path propagational delays and should not be confused with the pseudo-random code sequence offsets that can exist between different base stations 10 and sectors of a code-division, multiple-access system to produce orthogonal code relations that reduce or minimize interference between base stations 10 serving proximate geographic regions.

Each of the observed propagational delays falls within a range of possible propagational delays between the subscriber station 26 and the base station 10 serving the subscriber station 26 when the subscriber station is operating in the authorized coverage area. The values of the propagational delays vary with the location of the subscriber station and are determined by characteristics of terrain (e.g., topology), geometry of obstacles (e.g., morphology), reflective characteristics of obstacles, the distance between the subscriber station 26 and the base station 10, or other relevant factors. A shorter propagational delay likely represents a direct or line-of-site propagational path between the subscriber station 26 and the base station 10, whereas a longer propagational delay may result from multi-path propagation between the subscriber station 26 and the base station 10. If the impact of the distance between the subscriber station 26 and the base station 10 predominates over other propagational factors, the values of propagational delays may be generally correlated to each other within a circumferential zone about a base station 10 site. A characteristic of a particular receive signal may include not only its propagational delay, but also the antenna identifier of the antenna set over which the receive signal is received at a demodulating finger.

Fingerprint

A fingerprint refers to a snapshot of the signal characteristics of a receive signal 107. The signal characteristics may include one or more of the following: propagational delay, antenna identifier, and signal quality indicator (e.g., signal-to-noise ratio or a short-term average of signal strength). The highest quality, if not all, receive signals may be assigned to and demodulated by fingers. Therefore, the operational area monitor 12 preferably forms a composite fingerprint by periodically collecting the fingerprints of mature fingers. A mature finger is defined as a finger which has been assigned to a seemingly valid receive signal for a significant period of time (e.g., 200 milliseconds).

In an alternate embodiment, the operational area monitor 10 may use factors other than maturity to select fingers from which to take fingerprints for observation and computation of a composite fingerprint or a characteristic composite fingerprint. For example, in an alternate embodiment the operational area monitor 12 may use a signal quality indicator, as opposed to a minimum tracking time associated with maturity. In another alternative embodiment, the operational area monitor 12 may collect fingerprints from the signal search results from which finger assignments of the rake receiver are derived.

In each of the above embodiments, the signal characteristics for the fingerprint are readily available in existing CDMA base stations. Therefore, the operational area monitor 12 may comprise software instructions for a commercially available base station, without any additions to the base station hardware. Alternatively, the operational area monitor 12 may comprise a separate receiving and data processing system that searches for receive signals 107 and measures their characteristics independently from mechanisms of an existing base station. Other variations may be apparent to those skilled in the art, without departing from the scope of the invention.

Composite Fingerprints

Prior to monitoring the operational area of a subscriber station, the operational area monitor 12 takes a characteristic composite fingerprint of a subscriber station 26. A characteristic composite fingerprint is a statistical compilation of multiple fingerprints taken while a subscriber station 26 is operating within its authorized operational area. The characteristic composite fingerprint is considered to be a representative superset of any composite fingerprint taken from the authorized area. The characteristic composite fingerprint provides a reference for subsequent comparison to an operational composite fingerprint.

During a call, the operational area monitor 12 takes occasional fingerprints of the receive signals 107 and forms a composite fingerprint. A composite fingerprint is a statistical compilation of the data from multiple fingerprints of the receive signals 107, which are sampled from a subscriber station 26 during a call duration or data transmission duration. A composite fingerprint has a distribution of signal characteristics (e.g., propagational delay and antenna identifiers) which are influenced by the location and physical features of the operational area from which the subscriber station 26 transmits. ). Advantageously, selecting only mature fingerprints of finger assignments for inclusion in the composite fingerprint prevents the composite fingerprint from being corrupted by spurious signals or interference. If the subscriber station 26 transmits from a second operational area that is different from and sufficiently geographically separated from a first operational area, a first composite fingerprint associated with the first operational area is likely to differ from a second composite fingerprint associated with the second operational area in a statistically significant manner.

The difference between an operational composite fingerprint and a characteristic composite fingerprint is that the operational composite fingerprint may be associated with any location of the subscriber station, whereas the characteristic composite fingerprint is only associated with an authorized coverage area. The operational composite fingerprint may be compared with a previously computed characteristic composite fingerprint to determine whether the subscriber station is operating outside of an authorized operational area. In an alternate configuration, the operational composite fingerprint may be used as an input to compute a characteristic composite fingerprint so long as the subscriber station is operating from a known operational area or geographic location.

Processor of Operational Area Monitor

The antenna monitor 14 provides the processor 18 with the number of observations of reverse signals on antenna sets, with reference to corresponding antenna identifiers observed on a sampling interval by sampling interval basis. The propagational delay measurer 16 similarly provides observations of measured propagational delays to the processor 18 on a sampling interval by sampling interval basis. The processor 18 processes the foregoing measurements of antenna observations and propagational delays for a call of a particular subscriber station 26 operating in its authorized geographic area 36 to obtain the characteristic composite fingerprint. The processor 18 stores the characteristic composite fingerprint in an archival database in a storage device 19. The storage device 19 and the processor 18 may regularly or periodically send updates of characteristic composite fingerprints or fingerprint information to a home location register 30, an authentication center 28, or any other central network element to facilitate record-keeping of potentially fraudulent activity of a subscriber station 26. The processor 18 may also send alert data to the authentication center 28 if the operational area monitor 12 detects a subscriber station 26 operating outside of its authorized coverage area 36.

The home location register 30 stores subscriber information on the subscriber stations 26, such as the extent to which certain subscriber features are activated or not. The home location register 30 also provides an indication of where the subscriber station 26 is active or what base station 10 the subscriber station 26 most recently used.

Authentication Center

The authentication center 28 is responsible for verifying the identity of subscriber stations 26 to distinguish authorized subscriber stations 26 from unauthorized subscriber stations 26. The operational area monitors 12 within various base stations 10 within the wireless communications system may report communications activity of particular subscriber stations 26 in their restricted coverage areas 38 as potentially fraudulent activity. The authentication center 28 may be programmed to provide reports of potentially fraudulent activity to a service provider where the subscriber station 26 has been detected with an operational composite fingerprint that differs from a characteristic composite fingerprint. A history of potentially fraudulent activity may be addressed by the service provider as the service provider sees fit. For example, the service provider may charge a subscriber station, which is assigned to a fixed wireless service within an authorized coverage area, a premium service charge upon detection of repeated communications activity within the restricted coverage area. Alternately, the service provider may wish to establish a new characteristic composite fingerprint upon repeated detection of communications activity in the restricted coverage area in the event that the characteristic composite fingerprint is corrupt or inaccurate.

Instead of waiting for the service provider to analyze the reports of potentially fraudulent activity, in an alternate embodiment, the authentication center 28 may automatically deny access to, or immediately terminate in-progress communication with unauthorized subscriber stations. The authentication center 28 may cooperate with the operational area monitor 12 and respond to its provision of alert data to terminate the access of a subscriber station 26 to the wireless communication system and archive possible fraudulent transgressions if the subscriber station 26 moves from an authorized coverage area 26 to a restricted coverage area 28.

Method for Monitoring Operational Area of a Subscriber Station

Figure 2:
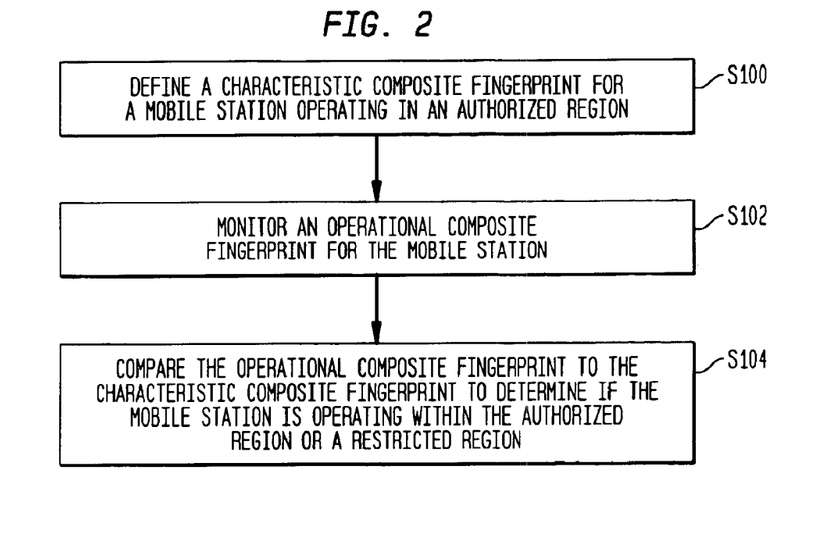
FIG. 2 is a flow diagram of a method for monitoring the operational area of a subscriber station in a wireless system in accordance with FIG. 1A.

FIG. 2 is a flow diagram of a method for monitoring the geographic operational area of a subscriber station 26 in accordance with the wireless system of FIG. 1A. Starting in step S100, an operational area monitor 12 of a base station 10 defines a characteristic composite fingerprint of a subscriber station 26 operating in the authorized coverage area 36. A fingerprint comprises at least one observation of a propagational delay and may include one observation of an antenna identifier. The observations of propagational delay and antenna identifiers may be used to identify a specific receive signal 107 during a sampling period. A composite fingerprint represents data collected from a group of fingerprints.

In step S100, a characteristic composite fingerprint may be defined in accordance with various alternative techniques. A characteristic composite fingerprint is associated with a geographic operational area, in the authorized coverage area 36, of a subscriber station 26. Each subscriber station 26 serviced by the wireless system 11 may have a unique characteristic composite fingerprint to the extent that their geographic operational regions are unique, although multiple subscriber stations 26 could have substantially identical or similar characteristic composite fingerprints.

In accordance with a first technique, which may be used in step S100, a composite fingerprint may be defined in terms of a first histogram and a second histogram. The first histogram includes observations of propagational delays taken for a particular subscriber station 26 during a call or data transmission over multiple sampling intervals. The second histogram includes observations per antenna identifier taken for a particular subscriber station during a call or data transmission over multiple sampling intervals. The antenna identifier preferably identifies antenna sets associated with different sectors of a sectorized site.

In accordance with a second technique, which may be used in step S100, a composite fingerprint may be defined in terms of probability density functions derived from the foregoing first histogram and the second histogram. In the case of a discrete random variable, an empirical probability density function may be referred to as an empirical probability mass function. For exemplary purposes, a histogram may be converted into an empirical probability density function by the following two steps: (1) normalization of the histogram blocks by the total number of samples under consideration and (2) dividing by the width of a histogram block. A histogram may be converted into an empirical probability density function in accordance with other techniques which are generally known and available in published works on statistics, industrial engineering, or the like.

In accordance with a third technique, which may be used in step S100, a composite fingerprint is expressed as a group of first histograms and a group of second histograms. Each first histogram within the group represents propagational delays per individual antenna identifiers. Each second histogram within the group includes antenna observations per antenna identifier for different sectors of a site. In accordance with a fourth technique, the composite fingerprint is expressed in terms of a probability density functions of the groups of first and second histograms of the third technique.

Step S100 includes a collection or gathering procedure for defining a characteristic composite fingerprint consistent with one of the foregoing techniques. The characteristic composite fingerprint may be gathered for storage in an archival database (e.g., in a storage device 19) according to various alternative techniques. In accordance with a first gathering procedure, a characteristic composite fingerprint is defined by transmitting at least one communication (e.g., call or message transmission) from the authorized coverage area 36 of intended use. For example, prior to full activation of communications service of the subscriber station 26, the service provider could require the subscriber to place an initial call within the authorized coverage area 36 to a specific phone number for calibration purposes to initially define the characteristic composite fingerprint. The characteristic composite fingerprint may be subsequently updated as cell cites are relocated or boundaries of authorized coverage areas and restricted coverage areas are changed by one or more subsequent calibrating calls. Under a second gathering procedure, the characteristic composite fingerprint may be built by ongoing averaging of multiple composite fingerprints from ordinarily occurring subscriber calls, without requiring a special calibrating call to a specific phone number.

The characteristic composite fingerprint may be stored in a database in the home location register 30, in the storage device 19 in the base station 10, or both in the home location register 30 and the storage device 19. In the home location register 30, each subscriber station identifier is associated with a corresponding characteristic composite fingerprint. The base station 10 may provide a base station identifier along with a characteristic composite fingerprint to the home location register 30 for storage in the database. In the case where an authorized coverage area is served by more than one base station, a distinct characteristic composite fingerprint may be provided for each base station identifier.

Figure 6A:
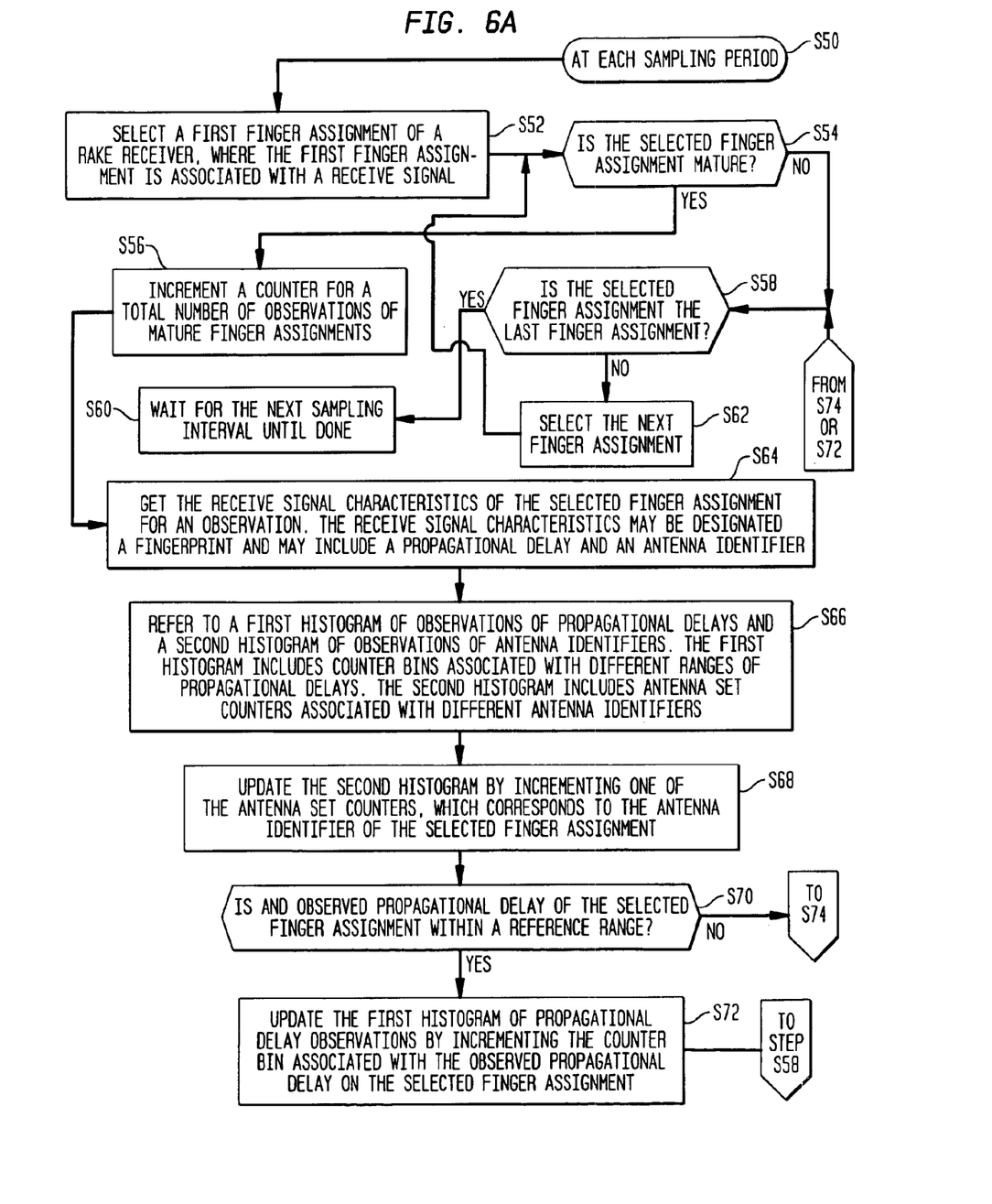
FIGS. 6A and 6B are a flow chart illustrating a method for forming a composite fingerprint in accordance with the invention.
Figure 6B:
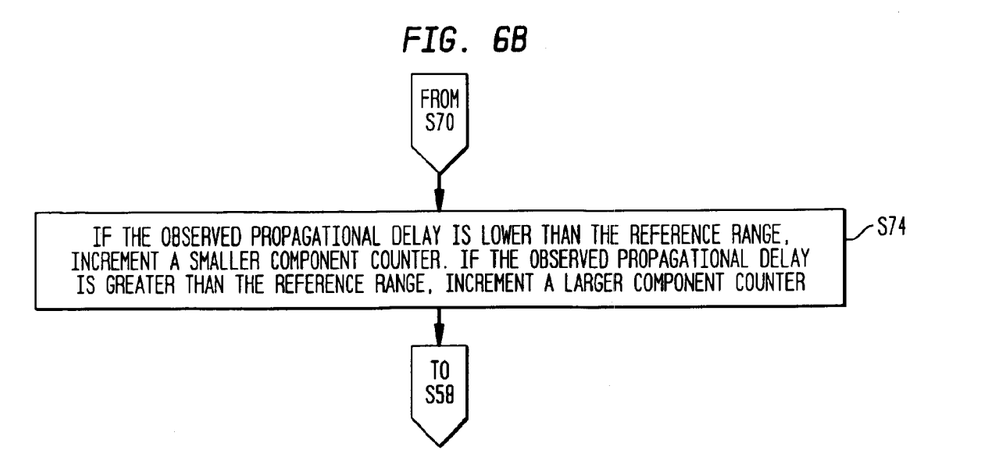

Continuing with the description of the flow chart in FIG. 2, in step S102 after step S100, the operational monitor 12 provides temporally random, regular or continuous samples of operational composite fingerprints for the subscriber station 26 as the subscriber station 26 operates on the wireless system 11. The operational composite fingerprint, the characteristic composite fingerprint, or both may be stored in an archival database in a storage device 19 of a base station 10. Alternately, the operational composite fingerprint may be transmitted to the home location register 30, the authentication center 28, or another central network element for comparison with the characteristic composite fingerprint. FIG. 6A and FIG. 6B show an exemplary procedure for step S100 and step S102 in greater detail than FIG. 2 and will be described later.

In step S104, one of the base stations 10 or another network element of the wireless system compares the operational composite fingerprint to the characteristic composite fingerprint to determine if the subscriber station 26 is operating within the authorized coverage area 36 or a restricted coverage area 38 of the wireless system 11.

In one example of implementing step S104, the base station 10 may compare the distribution of antenna observations of the characteristic composite fingerprint with the distribution of antenna observations of the operational composite fingerprint to determine if the subscriber station 26 is operating within the authorized coverage area 36 or in a restricted coverage area 38. Further, the base station 10 may compare the distribution of observations of propagational delays of the characteristic composite fingerprint to the distribution of observations of propagational delays of the operational composite fingerprint to determine whether the subscriber station 26 is operating in the authorized coverage area 36.

Figure 7:
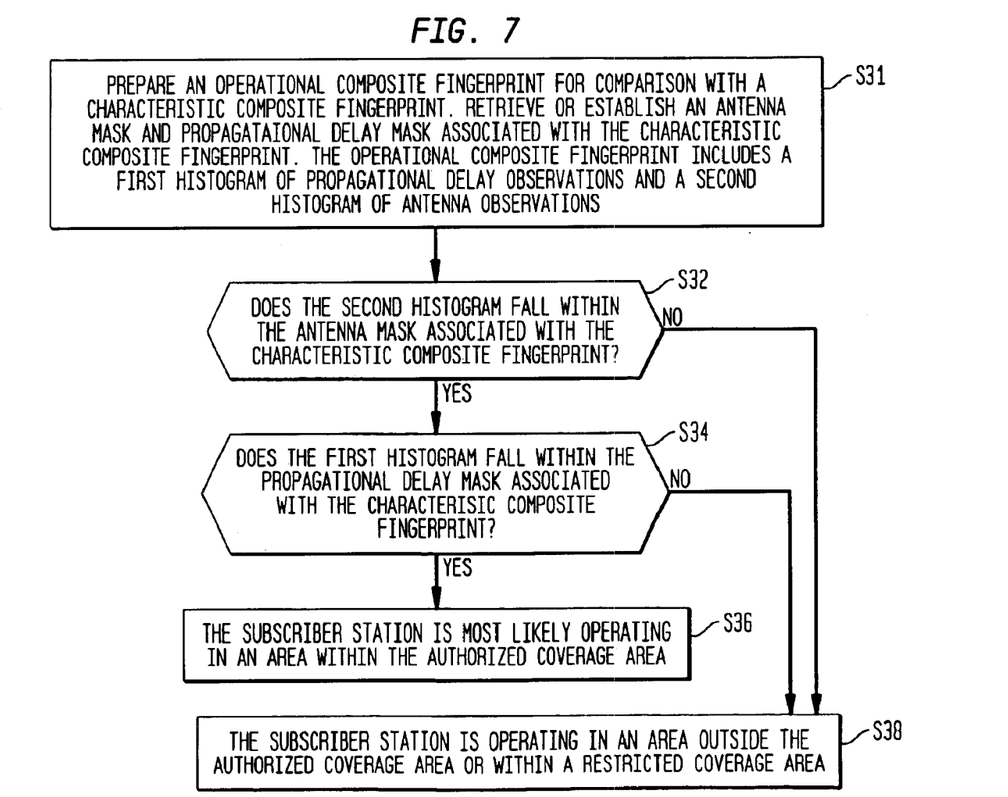
FIG. 7 is a flow chart illustrating one procedure for comparing an operational composite fingerprint to a characteristic composite fingerprint in accordance with the invention.
Figure 8:
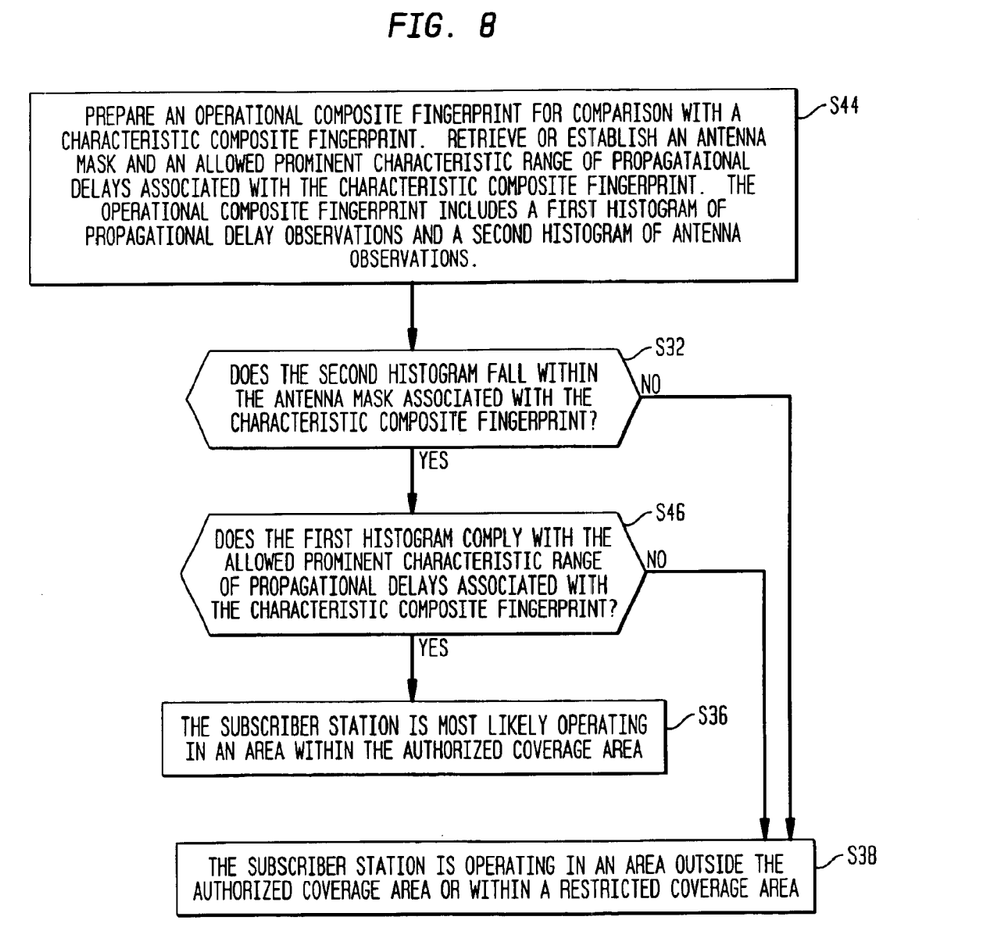
FIG. 8 is a flow chart of an alternate procedure for comparing the operational composite fingerprint to the characteristic composite fingerprint in accordance with the invention.

In an alternate comparison procedure, the base station 10 may send the operational composite fingerprint to the authentication center 28 at the end of the each call. Subsequently, the authentication center 28 may use a subscriber station identifier and a base station to retrieve the corresponding characteristic composite fingerprint from the home location register 30 or otherwise for comparison to the operational composite fingerprint. FIG. 7 and FIG. 8 show two exemplary procedures for step S104 in greater detail than FIG. 2 and will be described subsequently herein.

Histogram of Number of Observations of Propagational Delays

Figure 3:
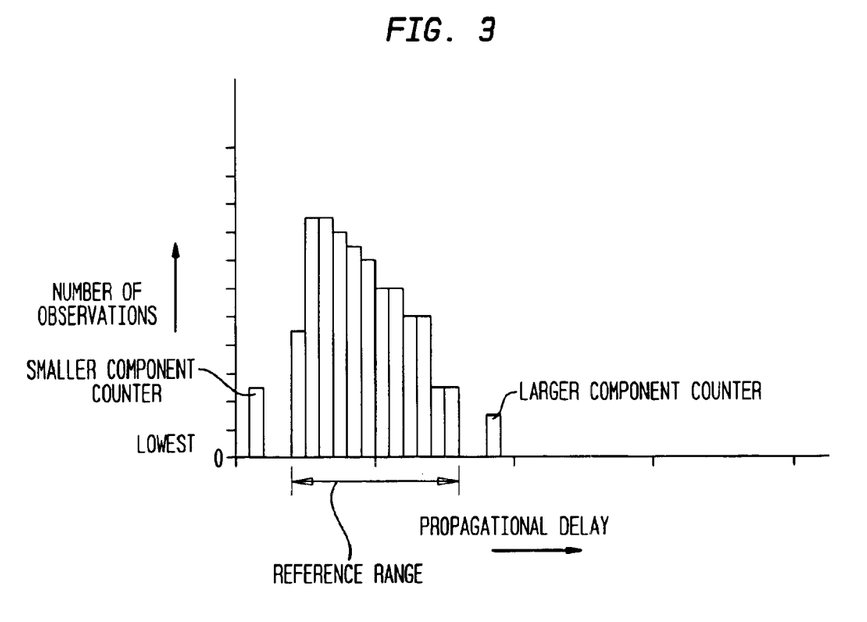
FIG. 3 is a histogram showing the number of times each propagational delay factor has been observed on at least one uplink antenna set of a base station in accordance with the invention.

FIG. 3 shows a histogram of the number of times each propagational delay has been observed for a subscriber station 26. The number of observations are measured on a sampling interval basis for a given subscriber station to define a characteristic composite fingerprint in step S100 or to facilitate monitoring of an operational composite fingerprint for step S102 of FIG. 2. FIG. 3 represents one possible form of the output of the propagational delay measurer 16. The horizontal axis of FIG. 3 is divided into temporal units of propagational delay from a shortest propagational delay to a longest propagational delay. The temporal units preferably have a resolution as high as fractional chips (e.g., one-eighth chip) of the pseudo-random code of a CDMA system. A chip refers to the signal corresponding to an individual term of a pseudo-random code sequence.

The vertical axis shows the number of observations of the corresponding propagational delays of the horizontal axis. In the context of FIG. 3, an observation refers to finding a reverse link signal or a derivative component thereof with the corresponding particular propagational delay between the subscriber station 26 and the base station 10 during or at a sampling interval. The distribution of the number of observations of propagational delay during a sufficient group of sampling intervals represents one factor for establishing the characteristic composite fingerprint and the operational composite fingerprint.

The reference range represents a desired scope of propagational delays which adequately define the geographic extent of the authorized coverage area. For example, the reference range may be chosen to encompass all expected uplink signals within the authorized coverage area. An uplink signal is transmitted from the subscriber station 26 to the base station 10. The detected propagational delays that fall within the reference range are grouped into intervals along the horizontal axis which may be referred to as counter bins. The counter bins outside of the reference range may be referred to as a smaller component counter and a larger component counter. The propagational delays that fall outside of the counter bins within the reference range are associated with a smaller component counter and a larger component counter.

Although the counter bins within the reference range of FIG. 3 indicated observations of propagational delays throughout the entire reference range, observations of particular propagational delays may be zero within the reference range. The histogram profile may be relatively narrow in the total range of observed propagational delays where a clear, unobstructed line-of-sight path and no reflective paths exist between the subscriber station 26 and the base station 10.

Figure 4:
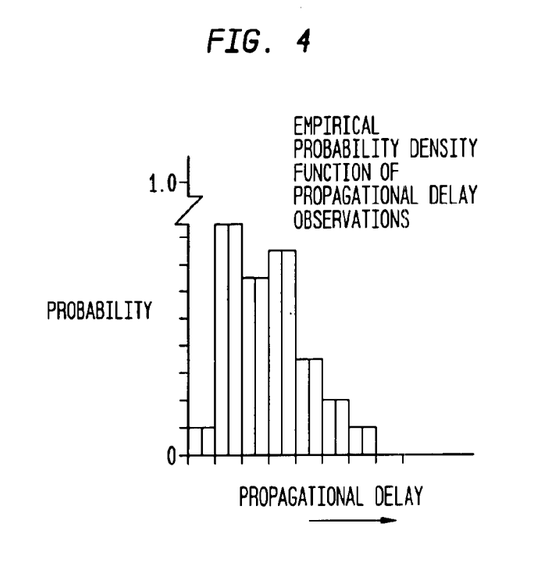
FIG. 4 is a graph of a probability density function of various propagational delays observed on an uplink antenna set in accordance with the invention.

The propagational delay measurer 16 or the processor 18 may convert the histogram of FIG. 3 into the empirical probability density function of FIG. 4, as previously described. FIG. 4 is an empirical probability density function, which shows the probability of observing particular propagational delays. The height of each bar represents the extent of probability of occurrence associated with a particular propagational delay between a particular subscriber station 26 and a base station 10 during a call or data transmission from a given geographic area.

Histogram of Number of Observations at Each Antenna Set

Figure 5:
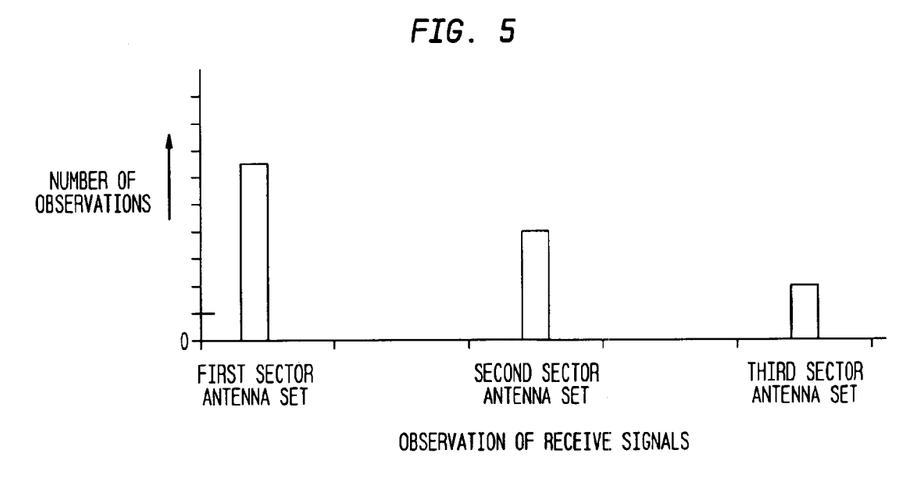
FIG. 5 is a histogram of a number of times received signals were observed on each antenna set of a sectorized base station in accordance with the invention.

FIG. 5 is histogram of the number of times received signals were observed on each antenna set. The histogram of FIG. 5 may be applied to execute the method of FIG. 2. The antenna identifiers are associated with corresponding uplink antenna sets of a base station 10. FIG. 5 represents one possible form of output of the antenna monitor 14. The antennas associated with a corresponding base station 10 are assigned antenna identifiers. For example, in the context of a site with three sectors, the base station 10 may be associated with six unique antenna identifiers. That is, each antenna set may include two antennas for diversity reception, where each antenna has a corresponding antenna identifier. An observation refers to the detection of one of the multiple temporally offset signals 107 on a particular antenna with an antenna identifier at a sampling interval or on a particular antenna set with a particular antenna set identifier at a sampling interval.

The antenna sets are located on the horizontal axis and the number of observations per antenna set is located on the vertical axis. The histogram of FIG. 5 may be converted into an empirical probability density function, as previously described.

Determination of a Composite Fingerprint

FIG. 6A and FIG. 6B show a preferred embodiment of step S100 and step S102 of FIG. 2. FIG. 6A and FIG. 6B involve the determination of a composite fingerprint for a corresponding subscriber station 26. As used herein, a composite fingerprint may refer to a characteristic composite fingerprint, an operational composite fingerprint, or both.

Upon the setup of a call, the monitor system 12 may prepare for the determination of the composite fingerprint by performing an initialization procedure. For example the initialization procedure may include the monitor system 12 determining a reference range for a histogram, a probability density function, or another representation, of propagational delays between the subscriber station 26 and the base station 10. The monitor system 12 associates a central propagational delay factor with the strongest signal strength of the initial receive signals 107 from the subscriber station 26. The central propagational delay factor forms a midpoint of the reference range. The propagational delay factor represents observing a finger (i.e., demodulator) in the rake receiver adjusted to demodulate a particular propagational delay at or during a sampling interval.

In the context of a code-division multiple-access (CDMA) system, the reference range may comprise a sufficient number of chips (e.g., 64 one-eighth chips) about the central propagational delay such that the reference range considers an adequate scope of area to encompass the entire range of expected propagational delay in an authorized coverage area.

The method of FIG. 6A and FIG. 6B is performed after the initialization procedure has been completed. Starting from step S50, the method of FIG. 6A and FIG. 6B is performed at one or more sampling intervals during a call or data transmission.

In step S52, the monitor 12 selects a first assigned finger of the rake receiver. The first assigned finger is associated with a receive signal transmitted from a subscriber station 26. A finger is dynamically assigned from time to time to a propagational path between a subscriber station 26 and the base station 10. A finger that is assigned to a propagational path at least for the sampling interval may be referred to as an assigned finger. A finger may be idle or unassigned if the number of fingers in the rake receiver exceeds the number of multi-path receive signals 107, for example.

In step S54 after step S52, the monitor 12 determines if the selected finger assignment (i.e., demodulator assignment) is mature. A finger assignment is mature if the finger has been tracking a valid propagational path by virtue of the finger being assigned to a propagational path of a subscriber station 26 for more than a minimum threshold time (e.g., 200 milliseconds). Both the maturity and the assigned status of the finger are judged on a sampling by sampling interval basis. If finger assignment is mature, the method continues with step S56. Otherwise, the method continues with step S58.

In step S56, the monitor 12 increments a counter for a total number of observations of the mature finger assignments. The counter may be incremented by one for each observation of a mature finger assignment during a call of the subscriber station. The total number of observations of mature finger assignments allows the monitor 12 to normalize the first and second histograms. The first histogram may be normalized by dividing the observations of propagational delays in each bin by the total number of observations of propagational delays for all of the bins. Similarly, the second histogram may be normalized by dividing the observations on antenna sets by the total number of observations of all antenna sets.

In step S58, which may follow step S54, the monitor 12 determines if the selected finger is the last finger for a sampling interval. If the selected finger for the sampling interval is the last finger the method continues in step S60.

In step S60, if all fingers have been read for a sampling interval, the processor 18 has finished its work for the current sampling interval and waits for the next sampling interval to occur, at which time the algorithm may be repeated beginning with step S50. However, the processor 18 does not wait for the next sampling interval if a done state is reached. The done state may be reached upon completion of a call, after a fixed time duration, or after a composite fingerprint is sufficiently complete.

If in step S58 the selected finger is not the last finger, the method continues with step S62. In step S62, the next finger is selected. In this way, the processor 18 increments to the next remaining finger until all fingers have been read during a sampling interval. The processor 18 preferably observes fingerprint data associated with all mature and assigned fingers within the measurement range for the duration of a communication between the subscriber station 26 and the base station 10.

Step S64 follows step S56, which was previously discussed. In step S64, the monitor 12 gets the receive signal characteristic (i.e., the fingerprint) of the selected finger for an observation. In the scheme of FIG. 6A and FIG. 6B, the fingerprint preferably includes a propagational delay observation and an antenna set observation (or an antenna identifier observation).

In step S66, the monitor 12 establishes or accesses a first histogram (e.g., FIG. 3) of observations of propagational delays and a second histogram (e.g., FIG. 5) of observations of antenna sets. The first histogram includes counter bins associated with different corresponding ranges of propagational delays. The second histogram includes antenna set counters associated with different corresponding antenna identifiers and their affiliated sectors.

In step S68, the monitor 12 updates the second histogram by incrementing one of the counters which corresponds to an observation on a particular antenna set. Although the counters may correspond to sectors of a base station, in practice the counters may be associated with corresponding antenna identifiers or antenna set identifiers in any antenna arrangement.

In step S70, the monitor 12 determines if an observed propagational delay of the selected finger is within a reference range. If the observed propagational delay is in the reference range, the method continues with step S72. If the observed propagational delay is not in the reference range, the method continues with step S74.

In step S72, the monitor 12 updates the first histogram of propagational delay observations by incrementing the counter bin associated with the observed propagational delay on the selected finger.

In an alternate technique, fingerprint data may be added to any suitable statistical representation of the operational coverage area, instead of adding fingerprint data to the first and second histograms. For example, the fingerprint data may be added to one or more probability density functions or a mathematical precursor to a probability density function. Such fingerprint data may also include other signal characteristics, such as a signal quality metric (e.g., signal strength or voice quality).

In step S74, which may follow step S70, the monitor 12 increments a smaller component counter or a larger component counter depending on the relationship of the observed propagational delay with respect to the reference range. The reference range is preferably established during the initialization procedure, as previously described. If the observed propagational delay is lower than the reference range, the processor 18 increments a smaller component counter. If the observed propagational delay is greater than the reference range, the processor 18 increments a larger component counter. The method returns from step S74 or from step S72 to step S58.

The above procedure of FIG. 6A and FIG. 6B provides a composite fingerprint or characteristic composite fingerprint of a subscriber station 26 relative to particular base station 10 at a base station site. The above procedure may be repeated for different subscriber stations.

For a given subscriber station 26, the procedure may be repeated at each base station 10 with which the subscriber station 26 communicates during a call. For example, when the authorized coverage area spans an area served by more than one base station 10, multiple characteristic composite fingerprints may be established for a single subscriber station 26 such that one characteristic composite fingerprint is stored for each participating base station 10. If multiple composite fingerprints are established for a single subscriber station 26 with respect to various surrounding base stations 10, the multiple composite fingerprints may enhance the statistical reliability or accuracy of determining whether the subscriber station is operating in the authorized coverage area.

Comparing Operational Composite Fingerprints to Characteristic Composite Fingerprints FIG. 7 and FIG. 8 show a preferred embodiment of step S104 of FIG. 2. FIG. 7 and FIG. 8 provide two alternative methods of comparing an operational composite fingerprint to a characteristic composite fingerprint to determine if the subscriber station 26 is operating within the authorized region or a restricted region. The method of FIG. 7 or FIG. 8 may be applied at the end of each call or at some fixed time into a call (e.g., fifteen seconds after call initiation).

In FIG. 7 starting in step S31, the characteristic composite fingerprint (or masks derived therefrom) and the observed operational composite fingerprint are arranged in memory or registers of the processor 18 for comparison to each other. The characteristic composite fingerprint may be retrieved from the archival database 19 in the storage device or elsewhere. The operational composite fingerprint and the characteristic composite fingerprint may each include two histograms, two probability density functions, or another suitable statistical representation. For example, the characteristic composite fingerprint and the operational composite fingerprint may each include the following two histograms: (1) a first histogram of observations of different propagational delays of a receive signal between a subscriber station 26 and a base station 10 during one or more communications and (2) a second histogram of observations of different antenna identifiers (e.g., for different sectors) of the receive signal during one or more communications. The first and second histograms of the characteristic composite fingerprint may be compared to corresponding first and second histograms of the operational composite fingerprint to determine whether the subscriber station 26 is operating in the authorized coverage area 36.

During step S31 or prior to step S31, an antenna mask and a propagational delay mask may be defined based on the characteristic composite fingerprint. For example, the antenna mask and the propagational delay mask are generated or updated when the characteristic composite fingerprint is defined. The antenna mask represents the expected range over which an operational composite fingerprint is expected to vary about the characteristic composite fingerprint when a subscriber station 26 is operating within the authorized coverage area 36. The propagational delay mask represents the expected range over which an operational composite fingerprint is expected to vary about the characteristic composite fingerprint when a subscriber station 26 is operating within the authorized coverage area 36. The operational composite fingerprint may vary from call to call and is expected to generally fall within the propagational delay mask and the antenna mask when the subscriber station is operating within the authorized coverage area 36.

In step S32, it is determined if the second histogram or another suitable representation of observations falls within an antenna mask. The antenna mask is preferably applied to each different antenna set (antenna set identifier) or antenna (antenna identifier) of a base station 10. The antenna mask may include a lower boundary and an upper boundary for each different antenna set or antenna associated with the base station 10. For example, a lower boundary may provide that at least twenty-five percent of observations must be on the first sector antenna set and an upper boundary may provide that no more than ninety percent of observations should be on the first sector antenna set.

In an alternate example, step S32 includes evaluating a probability density function of observations, instead of the second histogram, to determine whether the probability density function of observations fall within an allowable range defined by an antenna mask.

If the second histogram of observations is within the range defined by the antenna mask, the method continues with step S34. However, if the second histogram of observations is not within the range of the antenna mask, then the operational area of the subscriber station 26 is considered to be located outside the authorized coverage area 36 or within a restricted coverage area 38 in step S38.

In step S34, a first histogram of observations of propagational delays are evaluated to determine whether the distribution of observations of propagational delays for an uplink communication (e.g., call) fall within an allowable range. The allowable range is determined by a propagational delay mask. The propagational delay mask includes a constituent minimum mask and a constituent maximum mask associated with each different propagational delay factor or bin counter within the measurement range.

The constituent minimum mask and its associated constituent maximum mask are applied to each propagational delay factor within the measurement range. The constituent maximum mask specifies a maximum allowable percentage of observations of a particular propagational delay factor. The constituent minimum mask specifies a minimum allowable percentage of observations of a particular propagational delay factor.

If the percentage of observations at each particular propagational delay are within the allowable range defined by the propagational delay mask, then the method continues with step S36. In step S36, the propagational delays associated with a call to the base station 10 indicate that the subscriber station 26 is most likely operating within the authorized coverage area. If the propagational delays received at base station 10 are outside of the propagational delay mask, the method continues with step S38 in which the operational area of the subscriber station 26 is determined to be located outside the authorized coverage area 36.

Following step S38, the access of the subscriber station 26 may be denied, terminated, or tracked with respect to the wireless system 11. The authentication center 28 may authorize the transmission of a warning to the subscriber station 26 indicating that the subscriber station 26 is operating from an unauthorized coverage area and that the subscriber station 26 may be charged at a premium billing rate when operating outside the authorized coverage area 36 or even penalized for attempting to operate outside the authorized coverage area 36.

FIG. 8 is similar to the method of FIG. 7 and like reference numerals indicate like steps. However, FIG. 8 includes steps S44 and S46 rather than steps S31 and S34, respectively, of FIG. 7. Step S44 is similar to step S31, except an antenna mask and an allowed outside prominent characteristic range of propagational delays is retrieved or established. During or prior to step S44, the antenna mask and the allowed outside prominent characteristic may be defined based on the characteristic composite fingerprint. The antenna mask represents the expected range over which an operational composite fingerprint is expected to vary about the characteristic composite fingerprint when a subscriber station 26 is operating within the authorized coverage area 36. The allowed prominent characteristic range of propagational delays consists of a range of propagational delays, not necessarily contiguous, which are most likely observed when the subscriber station 26 is operating within its authorized coverage area 36.

In step S46, the processor 18 of the operational area monitor 12 compares an observed outside ratio to a benchmark outside ratio of propagational delays to determine if the subscriber station 26 is compliant with an allowed prominent characteristic range of propagational delays. The observed outside ratio represents a ratio of observed propagational delays, which are outside the allowed prominent characteristic range, to the total number of observed propagational delays regardless of whether they are inside or outside the allowed prominent characteristic. The benchmark outside ratio represents a maximum value which the observed ratio should not exceed when the subscriber station 26 is operating within its authorized coverage area.

If the observed outside ratio exceeds the benchmark outside ratio of propagational delays, then the subscriber station 26 does not comply with the allowed prominent characteristic range and the subscriber station 26 is determined to be operating outside of the authorized coverage area 36, as indicated by step S38. The method of FIG. 8 preferably triggers step S38 when the base station 10, the authentication center 28 or another network element detects the subscriber station 26 operating in an unauthorized coverage area 38 because the observed outside ratio is greater than or equal to the benchmark outside ratio.

In contrast, in step S36, the subscriber station 26 is most likely operating within the authorized region. The method of FIG. 8 triggers step S36 when the observed outside ratio is less than the benchmark outside ratio.

Once the mobile subscriber is identified as operating outside of the authorized coverage area 36 or inside a restricted coverage area 38, the information may be made available to the following network elements: (1) to the authentication center 28 to deny access to the system, (2) to a billing system (connected to the wireless switching center 32) to increase a charge for the use of a restricted coverage area 38, or (3) to the home location register 30 to record unauthorized uses in the home location register for fraud detection purposes.

Although the invention is primarily described with reference to a subscriber station 26 communicating with one base station 10 at a time, the method and system of the invention may be applied to the context of a soft hand-off from one base station 10 to another. Accordingly, each base station 10 participating in the soft hand-off would produce an operational composite fingerprint relative to the subscriber station 26. Multiple operational composite fingerprints could be compared to multiple corresponding characteristic composite fingerprints for the subscriber station 26. The operational composite fingerprint produced by each base station 10 should be compared with that base station's characteristic composite fingerprint to determine whether the subscriber station 26 is operating within an authorized coverage area. If the operational composite fingerprint is different from the corresponding characteristic composite fingerprint (determined with reference to a particular base station 10 serving a particular subscriber station 26), the particular subscriber station 26 is found to be operating outside of its authorized coverage area.

This specification describes various embodiments of the method of the present invention. The scope of the claims is intended to cover various modifications and equivalent arrangements of the illustrative embodiments disclosed in the specification. Therefore, the following claims should be accorded the reasonable broadest interpretation to cover the modifications of equivalent structures and features which are consistent with the spirit of the invention disclosed herein.

What is claimed is:

1. A method for monitoring whether a mobile subscriber station is operating in an authorized area of the mobile subscriber station, the method comprising:

monitoring an operational composite fingerprint of the mobile subscriber station; and comparing the operational composite fingerprint to a characteristic composite fingerprint of the mobile subscriber station to determine if the mobile subscriber station is operating within the authorized area; the characteristic composite fingerprint being associated with the authorized area.

2. The method according to claim 1 further comprising, prior to the comparing step, the step of defining the characteristic composite fingerprint for the mobile subscriber station associated with operating in the authorized area.

3. The method according to claim 2 wherein the defining step comprises organizing a first histogram of observations of propagational delays associated with a reverse link transmission of the mobile subscriber station from the authorized area.

4. The method according to claim 3 wherein the defining step comprises organizing a second histogram of antenna observations per antenna set associated with the reverse link transmission of the mobile subscriber station from the authorized area.

5. The method according to claim 2 wherein the defining step comprises organizing a probability density function of probability versus propagational delays associated with a reverse link transmission of the mobile subscriber station from the authorized area.

6. The method according to claim 2 wherein the defining step comprises grouping propagational delay factors based on time differences of reference pseudo-random codes with respect to received pseudo-random codes, wherein the mobile subscriber station transmits on the reverse channel using the known reference pseudo-random code.

7. The method according to claim 1 wherein the monitoring step comprises the substeps of:

measuring a number of observations of different propagational delays within a measurement range during an uplink transmission of the mobile subscriber station;

measuring a number of antenna observations of receive signals, of the uplink transmission, detected on each distinct uplink antenna of a base station;

incrementing antenna set counters and counter bins associated with the corresponding observations in a first histogram of propagational delays and in a second histogram of antenna observations, respectively, to form the operational composite fingerprint for comparison to the characteristic composite fingerprint.

8. The method according to claim 7 wherein the monitoring step further comprises the substep of normalizing the first and second histograms.

9. The method according to claim 7 wherein the monitoring step further includes the substeps of:

determining a reference range about a central propagational delay factor associated with a corresponding strongest reverse channel signal strength for the mobile subscriber station for propagational delays observed at a beginning of the uplink transmission; and establishing a smaller component counter and a larger component counter to track measured propagational delays that fall outside of a reference range to form the operational composite fingerprint for comparison to the characteristic composite fingerprint.

10. The method according to claim 7 further comprising making the observations based upon signal characteristics of mature finger assignments.

11. The method according to claim 7 further comprising attaining the observations from a signal searcher.

12. The method according to claim 1 wherein the comparing step further comprises determining if a first histogram of measured propagational delay factors fall within a propagational delay mask.

13. The method according to claim 12 wherein the comparing step further comprises determining if a second histogram of measured observations of antenna sets falls within an antenna mask.

14. The method according to claim 1 wherein the comparing step further comprises determining that the mobile subscriber station is most likely operating within the authorized area if a first histogram of measured propagational delay factors falls within a propagational delay mask and if a second histogram of measured observations of antenna sets falls within an antenna mask.

15. The method according to claim 1 wherein the comparing step further comprises determining that the mobile subscriber station is operating in the restricted coverage area if a first histogram of measured propagational delay factors falls outside of a range defined by a propagational delay mask or if a second histogram of measured observations of antenna sets falls outside of a range defined by an antenna mask.

16. The method according to claim 1 wherein the comparing step further comprises determining that the mobile subscriber station is most likely operating within the authorized area if a first statistical representation of measured observations falls within an antenna mask and if a second statistical representation does not exceed a maximum outside prominent characteristic of measured observations of propagational delays.

17. The method according to claim 1 wherein the comparing step further comprises determining that the mobile subscriber station is operating in the restricted area if a first statistical representation of measured propagational delay factors falls outside of a range defined by a propagational delay mask or if a second statistical representation of the measured propagational delay factors exceeds a maximum outside prominent characteristic of measured occurrences of propagational delays.

18. A system for monitoring whether a mobile subscriber station is operating in an authorized area of the mobile subscriber station, the system comprising:

a monitor for monitoring an operational composite fingerprint of the mobile subscriber station; and a processor for comparing the operational composite fingerprint to a characteristic composite fingerprint of a mobile subscriber station to determine if the mobile subscriber station is operating within the authorized area; the characteristic composite fingerprint being associated with the authorized area.

19. The system according to claim 18 further comprising a storage device for storing the characteristic composite fingerprint for a mobile subscriber station associated with operating in the authorized area.

20. The system according to claim 18 wherein the monitor comprises an antenna monitor for monitoring the number of temporally offset receive signals, originating from a transmission of the mobile subscriber station, incident upon each distinct uplink antenna set of a base station.

21. The system according to claim 18 wherein the monitor comprises a propagational delay measurer for measuring the propagational delays of temporally offset receive signals originating from a transmission of the mobile subscriber station.

22. The system according to claim 18 wherein the characteristic composite fingerprint includes a first histogram of observations of propagational delays associated with a reverse link transmission of the mobile subscriber station from the authorized area.

23. The system according to claim 22 wherein the characteristic composite fingerprint includes a second histogram of antenna observations per antenna or per antenna set for the reverse link transmission of the mobile subscriber station from the authorized area.

24. The system according to claim 18 wherein the characteristic composite fingerprint includes a probability density function of probability versus propagational delays associated with a reverse link transmission of the mobile subscriber station from the authorized area.

25. The system according to claim 18 wherein the characteristic composite fingerprint includes propagational delay factors based on time difference between a reference pseudo-random code and a received pseudo-random code, wherein the mobile subscriber station transmits on a reverse channel using the reference pseudo-random code.

* * * * *